O. H. TAPPAN.
HAND STAMP.
No. 10,263. Reissued Dec. 26, 1882.
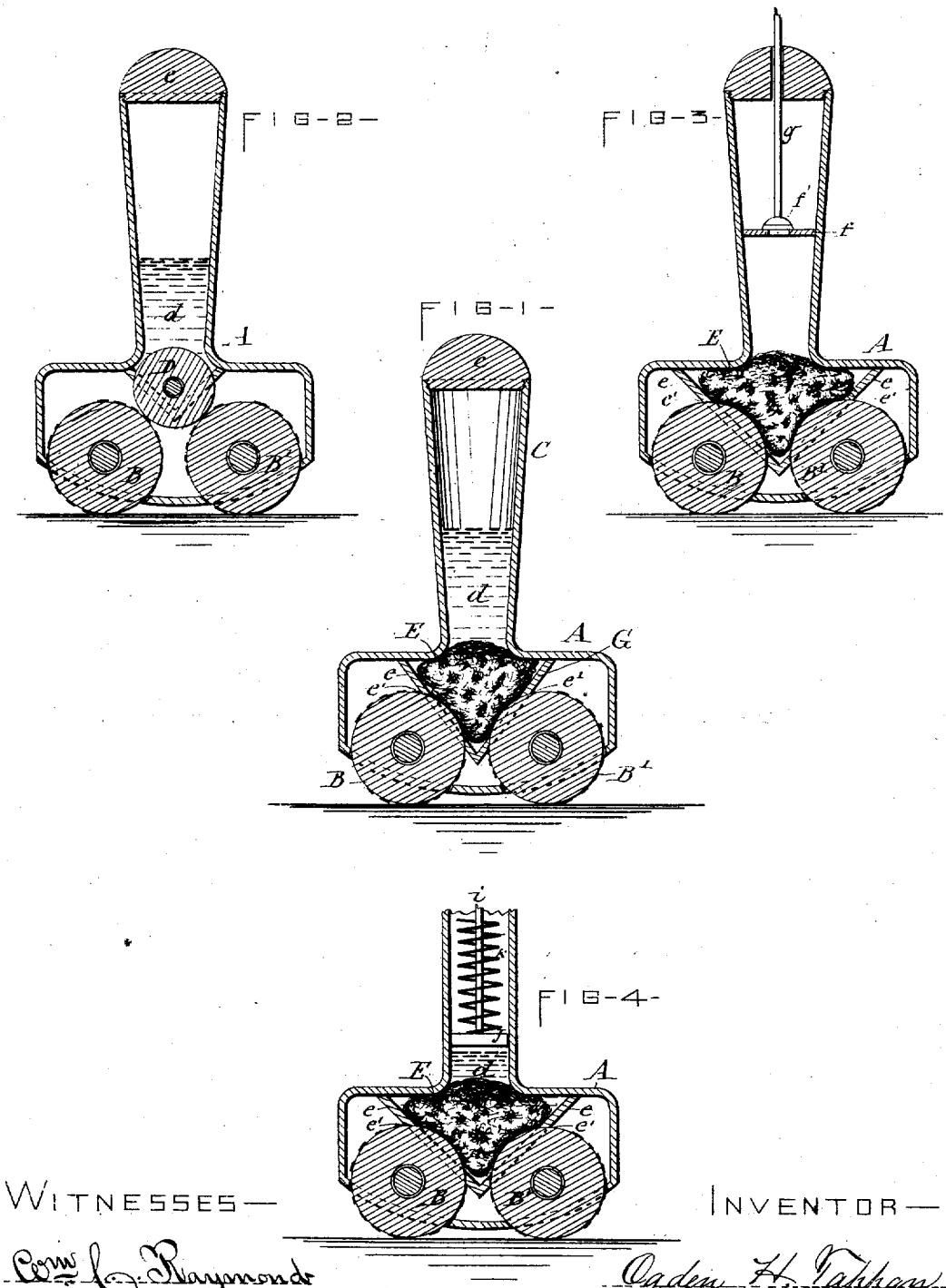
WITNESSES—
Wm. C. Raymond
J. C. Laass
INVENTOR—
Ogden H. Tappan
per Duell, Laass & Hey
his Attorneys
N. PETERS, Photo-Lithographer, Washington, D. C.

UNITED STATES PATENT OFFICE.

OGDEN H. TAPPAN, OF POTSDAM, NEW YORK.

HAND-STAMP.

SPECIFICATION forming part of Reissued Letters Patent No. 10,263, dated December 26, 1882.

Original No. 247,710, dated September 27, 1881. Application for reissue filed May 15, 1882.

*To all whom it may concern:*

Be it known that I, OGDEN H. TAPPAN, of Potsdam, in the county of St. Lawrence and State of New York, have invented new and useful Improvements in Hand-Stamps, of which the following is a specification.

This invention relates to a novel, convenient, and effective marking and stamping device adapted for use in post-offices for expeditiously and effectually canceling postage-stamps and postmarking on all kinds of mail matter.

The invention consists in a novel construction and combination of its constituent parts, as hereinafter fully described, and set forth in the claims.

In the annexed drawings, Figure 1 represents a vertical sectional view of my invention, and Figs. 2, 3, and 4 represent like views of modifications thereof.

Similar letters of reference indicate corresponding parts.

A represents a metallic frame, in which are journaled two wheels or rolls, B B′, which may be designated "marking-roll" and "canceling-roll," respectively, according to the work required of them, a portion of the convex side of said rolls being sufficiently exposed below the frame A to allow them to be brought in contact with the surface to be marked or operated on. From the top of the frame A projects upward a handle, C, which is tubular or hollow and closed at the top by a screw-cap, *c*, said handle serving as a reservoir, *d*, for the ink, which is retained therein and gradually supplied to the rollers B B′ by an interposed pad, E, of sponge or other absorbent and suitable material, packed in a chamber, G, which is attached to the frame A, over the rollers B B′, and communicates with the superimposed reservoir *d*. The side or bottom plates *e e* of the chamber G are provided with slots *e′ e′*, through which a portion of the convex faces of the two rolls B B′ are brought in contact with the pad E, and are thus supplied with ink. The marking and canceling wheels B B′ are in the form of cylinders, composed of metal, rubber, celluloid, or other suitable material, and may be either solid or formed with a core of different material. The marking or printing cylinder or wheel B has raised letters formed on its periphery for either one or two postmarks, and is also formed with suitable depressions or undercut grooves for holding removable type which may be inserted for printing the date. The canceling-wheel B′ may be plain, or it may have devices, letters, or figures formed on it, as desired; and it may have needle-points for mutilating the stamps.

Instead of using the sponge or absorbent material for supplying the ink to the surfaces of the wheels or rolls B B′, a third wheel, D, bearing upon the aforesaid rolls and revolving directly in contact with the ink, as shown in Fig. 2 of the drawings, may be used, and the reservoir containing the ink may be divided by the diaphragm *f*, containing a valve, *f′*, operated by the rod *g*, which passes through the screw-cap *c*, as shown in Fig. 3, by which means the ink contained in the space above the diaphragm may be admitted to the pad E as the ink in the latter becomes exhausted; or, instead of the diaphragm, the piston J, having the rod *i*, and forced down by the spring *k*, as shown in Fig. 4, may be used, which will keep the pad E saturated, and by this means ink of as heavy body as printer's ink may be used.

Although I have shown and described my invention more particularly with reference to its application for postmarking and stamp-canceling, it is obvious that it may also be used for dating and receipting, and for many other purposes, in which case only the printing-roller would be required. When used for postmarking and stamp-canceling, I would suggest the following *modus operandi* of my invention, viz: A package of letters is held in one hand, like a pack of playing-cards, while the stamp is slightly tilted and the roll B passed over it to imprint the date. The stamp is then tilted in the other direction and the roll B′ passed over the postage-stamp to cancel it.

What I claim as my invention is—

1. A combined marking and canceling stamp consisting of two rollers—one for marking and the other for canceling—arranged one in front of the other, and pivoted to the same frame, a hollow handle rising from said frame midway between the two rollers, a chamber arranged at the base of the handle and provided with slots for the passage of a portion of the rollers, and absorbent material placed in said chamber and feeding the ink to both rollers, substantially as shown.

2. A hand-stamp carrying two parallel rolls, B B′, one to postmark, the other to cancel, and both receiving their supply of ink from the same reservoir in the handle and through the same intermediate feed, as shown and described.

In testimony whereof I have hereunto set my hand this 3d day of May, 1882.

OGDEN H. TAPPAN.

Witnesses:
C. H. DUELL,
WM. C. RAYMOND.